United States Patent
Berberana (10) Patent No.: US 8,744,472 B2
(45) Date of Patent: Jun. 3, 2014

(54) METHOD FOR REPORTING CHANNEL QUALITY INFORMATION AND SYSTEM THEREOF

(75) Inventor: Ignacio Berberana, Madrid (ES)

(73) Assignee: Telefonica S.A., Madrid (ES)

( * ) Notice: Subject to any disclaimer, the term of this patent is extended or adjusted under 35 U.S.C. 154(b) by 272 days.

(21) Appl. No.: 13/316,088

(22) Filed: Dec. 9, 2011

(65) Prior Publication Data

US 2012/0315939 A1 Dec. 13, 2012

(30) Foreign Application Priority Data

Dec. 15, 2010 (EP) .................................. 10195241

(51) Int. Cl.
*H04W 72/08* (2009.01)

(52) U.S. Cl.
USPC ............... 455/452.2; 455/509; 455/67.11; 455/452.1

(58) Field of Classification Search
USPC ........ 455/67.11, 67.13, 452.1, 453, 450, 509, 455/464, 501, 62, 452.2; 370/329, 322, 341
See application file for complete search history.

(56) References Cited

U.S. PATENT DOCUMENTS

| | | | | |
|---|---|---|---|---|
| 8,149,772 | B2 * | 4/2012 | Sumasu et al. ................. | 370/329 |
| 2009/0003274 | A1 | 1/2009 | Kwak et al. | |
| 2009/0257356 | A1 | 10/2009 | Frederiksen et al. | |
| 2010/0093287 | A1 * | 4/2010 | Higuchi et al. ............ | 455/67.13 |

FOREIGN PATENT DOCUMENTS

| | | |
|---|---|---|
| EP | 2 129 155 A1 | 12/2009 |
| WO | WO 2008/012672 | 1/2008 |
| WO | WO 2010/040287 | 4/2010 |

OTHER PUBLICATIONS

European Search report dated Aug. 16, 2011 for European Application No. 10195241.4.
Motorola, *CQI Feedback Scheme for EUTRA*, 3$^{rd}$ Generation Partnership Project (3GPP); Technical Specification Group (TSG) Radio Access Network (RAN), No. R1-051344, Nov. 7, 2005, XP002404198, pp. 1-9.
*System Level Simulation and Analysis of CQI Reporting Schemes*, 3GPP Draft; R1-071546, 3$^{rd}$ Generation Partnership Project (3GPP), Mobile Competence Centre, Apr. 3, 2007, XP050105477, France.
*System Level Evaluation of CQI Compression Schemes for E-UTRA*, 3GPP Draft; R1-072099, 3$^{rd}$ Generation Partnership Project (3GPP), Mobile competence Centre, May 2, 2007, XP050105852, France.

(Continued)

*Primary Examiner* — John J Lee
(74) *Attorney, Agent, or Firm* — Workman Nydegger (57) ABSTRACT

A method for reporting channel quality information in a wireless telecommunication network, wherein the network includes a radio base station in wireless communication with a plurality of user equipments by user transmission channels, and wherein the method includes the radio base station: detecting a coherence bandwidth associated to a total transmission channel, the total transmission channel including the user transmission channels of the plurality of user equipments; selecting one reporting technique for reporting channel quality information among a plurality of available reporting techniques, the selection being based on the coherence bandwidth; and transmitting a first message to each of the plurality of user equipments, the message reporting an indication of the selected reporting technique. A radio base station, a public mobile network and a user equipment suitable to implement the method are also disclosed.

14 Claims, 5 Drawing Sheets

(56) References Cited

OTHER PUBLICATIONS

Alcatel-Lucent, *CQI Feedback Agreements and Proposals*, 3GPP Draft, R2-073144_CQI Feedback Agreements and Proposals, $3^{rd}$ Generation Partnership Project (3GPP), Mobile Competence Centre, vol. RAN WG2, No. Athens, Greece, Aug. 15, 2007, XP050135870, France.

Telefonica, *CSI Feedback in Large Coherence Bandwidth Environments*, Nov. 2010, XP000002655448, 5 pages.

Telefonica, *CSI Feedback Reduction in Practical Deployments*, 3GPP Draft; R1-111715 CSI Feedback Reduction in Practical Deployments, $3^{rd}$ Generation Partnership Project (3GPP), Mobile Competence Centre, vol. RAN WG1, May 3, 2011, XP050491327, France.

* cited by examiner

METHOD FOR REPORTING CHANNEL QUALITY INFORMATION AND SYSTEM THEREOF

CROSS-REFERENCE TO RELATED APPLICATIONS

This application claims priority to European Application No. EP 10195241.1, filed Dec. 15, 2010, which is incorporated herein by specific reference.

BACKGROUND OF THE INVENTION

1. The Field of the Invention

The present invention relates to the field of telecommunications, and in particular to methods for reporting channel quality information in a wireless telecommunication network. The invention also relates to devices suitable for providing the above method.

2. The Relevant Technology

Communication over a time-varying radio channel, i.e., a real radio channel, is subject to radio channel disturbances such as additive white Gaussian noise (AWGN), flat and frequency-selective fading, and log-normal shadow fading. These disturbances introduce losses in the received information and degrade quality of the delivered service.

Different applications require different quality of service (QoS) levels: what is good for voice may not be good for video, for example. To ensure that the QoS for a specific application is met under varying radio channel conditions, radio channel adaptation techniques are useful. This involves implementing radio channel quality measurement and control. Measurement of the radio channel quality comprises estimation of one or more of radio link measures such as the received signal strength (RSS), the signal-to-noise ratio (SNR), signal-to-interference-plus-noise ratio (SINR), the bit-error-rate (BER) etc. The control part of radio channel adaptation involves adapting the modulation, coding, and/or power of the transmitted signal within system capabilities and constraints based on the radio channel quality measurements.

In some of the present telecommunication systems, mobile terminals send to base station messages containing information about the quality of the transmission channel, this information includes a Channel Quality Indicator (CQI), i.e., a value that results from the radio link measures.

In particular, 3GPP committee has worked on the standardization of the evolution of the UMTS mobile communications system denominated Long Term Evolution (LTE) that uses CQIs. These system will also use orthogonal frequency division multiplexing (OFDM) based techniques for the radio interface, i.e., a multicarrier transmission technique of transmitting information in parallel over multiple subcarriers. OFDM brings significant advantages to the radio transmission techniques of mobile wireless broadband systems, one over the other is the reduced intersymbol interference in the multipath propagation environments.

In both downlink and uplink, a basic scheduling unit is denoted as a resource block. In LTE, a resource block is defined as 7 or 6 consecutive OFDM symbols in the time domain depending on the cyclic prefix length (normal or extended) and 12 consecutive subcarriers (180 kHz) in the frequency domain.

One of the advantages of using OFDM in the LTE radio interface is the possibility of supporting frequency selective scheduling (FSS) based on the CQI provided by the mobile terminal and the estimations performed by the base station based on the sounding reference signals (SRSs) sent by the mobile terminal. This feature allows to take advantage of the multipath propagation conditions that are common in mobile communications. The base station, based on the CQI reported by the mobile terminal (for the downlink) and its own channel estimation from the reception of the SRSs (for the uplink), select the Modulation and Coding Scheme (MCS) to be used and the specific time/frequency resources of the subframe assigned to each mobile terminal. LTE also supports scheduling mechanisms that provide frequency diversity gains, as, for example, with frequency hopping, when frequency dependent scheduling is not adequate because the propagation channel exhibits a large delay spread.

The most likely operating conditions that stress LTE system capabilities is the deployments in dense urban areas with a high density of base station. In these environments the system is dimensioned (i.e., the number of base stations to be installed) more on capacity requirements rather than maximum coverage distance, as a consequence, the distance between base station is relatively small (as low as 150-200 meters). Similar conditions rise when LTE systems are deployed specially in indoor environments via the use of picocells and/or femtocells.

As a consequence, due to restrict distance between the transmitter and the receiver, wave propagation is mainly accomplished without obstacles, i.e., with a higher proportion of line of sight propagation.

It is considered that the sophisticated, frequency selective scheduling mechanisms proposed for LTE are less effective in this kind of environments due to the fact that the coherence bandwidth of the propagation channels is relatively large with respect to the system bandwidth, reducing the opportunistic gain associated with the aforementioned mechanisms.

The coherence bandwidth is a statistical measurement of the range of frequencies over which the channel can be considered "flat", in other words the signal spectral components falling outside the coherence bandwidth will be affected differently by the transmission through the channel, compared with those components contained within the coherence bandwidth.

Most of the evaluations of LTE scheduling algorithms are based on the use of standardized channel models that have a coherence bandwidth smaller than 1.5 MHz. However, estimations carried out in realistic simulation environments, using 3D cartography and real sites locations, show that in urban areas coherence bandwidth significantly exceeds this value.

Patent application US 2009/0257356 A1 discloses a CQI including a report indicative of a value of a first channel quality metric related to one or more resource blocks, and a second report indicative of the value of the channel quality metric over the entire channel. The channel quality metric may be a signal to interference plus noise ratio (SINR), and the second channel quality report may be indicative of a difference between a mean value of the SINR of the resource blocks exceeding a predetermined threshold and a mean value of the SINR over the entire channel.

The CQI reporting method of this patent application makes use of a bit mask where each bit takes a value of 0 or 1 if the CQI of the resource block is higher or lower than an established threshold. Therefore the size of this bit mask in bits is equal to the number of resource blocks.

This method provides the network with good information on channel quality over a big frequency spectrum, yet it requires a lot of radio resources for CQI reporting.

OBJECTS AND SUMMARY OF THE INVENTION

It is an object of the present invention to overcome the drawbacks of the prior art.

In particular, it is an object of the present invention to present a method for reporting channel quality information which is alternative to the prior art.

It is an object of the present invention to provide a method for reporting channel quality information that adapts to different channel conditions.

It is another object of the present invention to provide a method for reporting channel quality information which is more efficient in real environment.

According to the invention these and other objects are achieved by means of a method comprising the features of the annexed claims, which are an integral part of the present description.

The invention also relates to a network adapted to implement this method.

According to one aspect of the invention, each mobile terminal is connected to a base station of the network trough a transmission channel. The base station detects a coherence bandwidth for the total transmission channel and selects a technique for reporting channel quality information. The selection is based on the coherence bandwidth detected. Therefore, the base station sends to each mobile terminal a message including an indication about which technique has been selected for CQI reporting.

In a preferred embodiment, the radio base station detects the coherence bandwidth based on channel quality information received by the user equipments.

This choice for detecting the coherence bandwidth is advantageous since make use of an information that is already available for the base station, saving computational resources.

Advantageously, one of the available CQI reporting techniques comprises the transmission between mobile terminal and base station of the following set of values: a channel quality indicator, an index representing a starting resource block and a number of adjacent resource blocks. The channel quality indicator is calculated over a resource block interval defined by said starting resource block and said number of adjacent resource blocks. This technique allows using very reduced network resources, in other words a very reduced number of bits is necessary for the transmission of this CQI reporting technique.

Preferably, the set of values is chosen in order to maximize the product between the number of adjacent resource blocks and the bit rate per resource block associated to the channel quality indicator. As a consequence, the optimal bit rare is always available.

According to another aspect of the invention, the previous available technique is selected if the coherence bandwidth is larger than the bandwidth of the transmission channel. This feature allows to apply the previous technique in urban area conditions, where it is very advantageous.

The invention is also directed to a radio base station suitable for implementing the method described above. The radio base station comprises means for establishing a wireless connection with a plurality of user equipment, means for receiving channel quality information from the plurality of user equipments, and means for detecting a coherence bandwidth associated to a total transmission channel. The total transmission channel includes the user transmission channels of the user equipments connected. The radio base station further comprises means for selecting one reporting technique for reporting channel quality information among a plurality of available reporting techniques, wherein the selection is based on the coherence bandwidth detected, and means for transmitting a message reporting the selected technique to each of the user equipments.

The invention is also directed to a public mobile network characterized by comprising at least a radio base station as described above.

Finally, it is remarked that the invention is also directed to a user equipment which comprises means for establishing wireless connection to at least a radio base station of a wireless communication network, and means for reporting a channel quality information to the radio base station. The user equipment is adapted to report said channel quality information according to a MAB_CQI reporting technique which comprises the following set of values:

a channel quality indicator,
an index representing a starting resource block and
a number of adjacent resource blocks.

The channel quality indicator is calculated over a resource block interval defined by said starting resource block and said number of adjacent resource blocks.

Further objects and advantages of the present invention will be clear from the following description of a preferred embodiment disclosed as non limitative and exemplificative example.

BRIEF DESCRIPTION OF THE DRAWINGS

The invention will be presented here below with reference to non limiting examples, provided for explicative and non limitative reasons in the annexed drawings. These drawings illustrate different aspects and embodiments of the present invention and, where appropriate, reference numerals illustrating like structures, components, materials and/or elements in different figures are indicated by similar reference numbers.

DETAILED DESCRIPTION OF THE PREFERRED EMBODIMENTS

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

In the following description the use of "e.g.," "etc," and "or" indicates non-exclusive alternatives without limitation unless otherwise noted. The use of "including" means "including, but not limited to," unless otherwise noted. Similarly, "comprising" means "comprising, but not limited to,".

Figure 1:
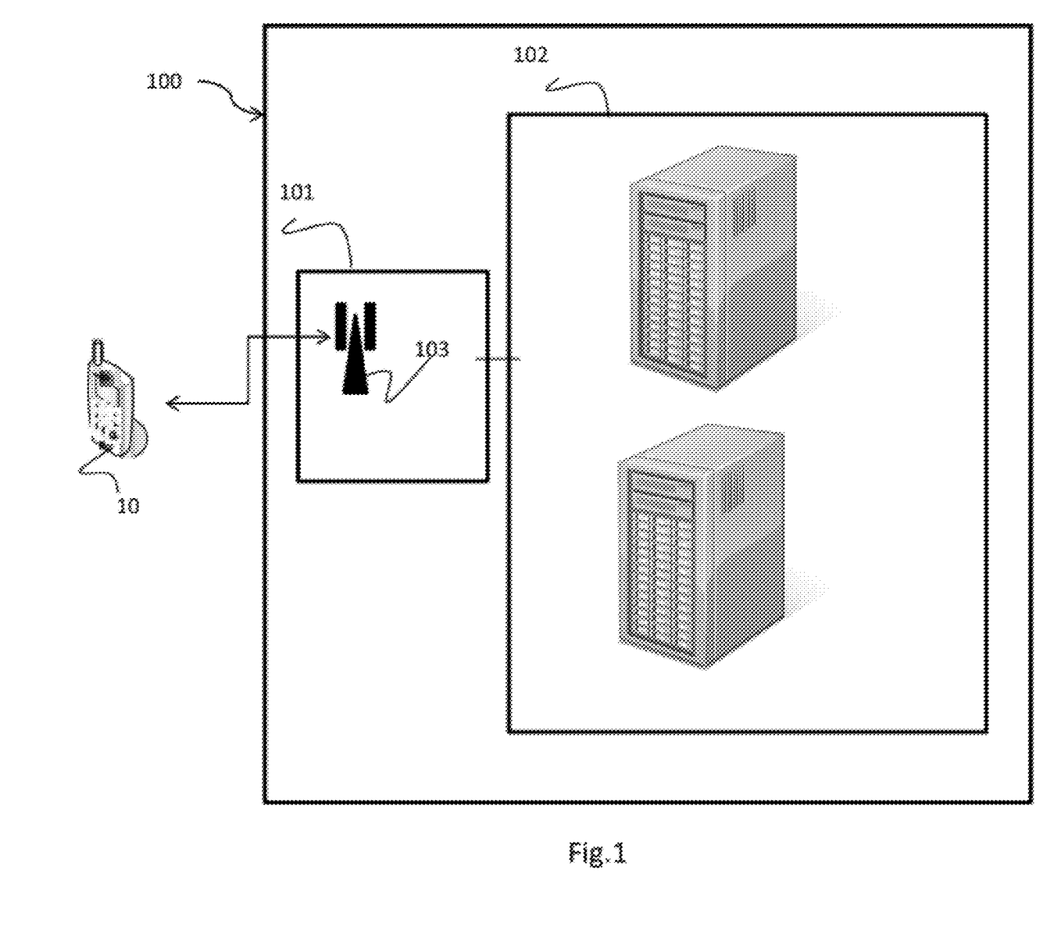
FIG. 1 illustrates a mobile terminal and a network that implement the method of the present invention.

FIG. 1 discloses a mobile terminal 10 (also known as user equipment) connected to a telecommunication network 100, in particular a PLMN (Public Land Mobile Network), which allows implementing a method for selecting a technique of reporting channel quality information. More in particular PLMN use orthogonal frequency division multiplexing and/or multiple input and multiple output techniques.

Network 100 comprises an access subsystem 101 and a core network 102.

The access subsystem comprises all the equipment necessary to establish communication with a user, e.g., radio base stations 103 also known as eNodeB in LTE networks), radio network controllers (not present in LTE networks, but present in UMTS networks) and so on.

The core network 102 is connected to the access subsystem 101 and comprises all the devices for routing flows of information between users of the network or between a user of the network and a user of an external network, e.g., database and application servers.

Figure 2:
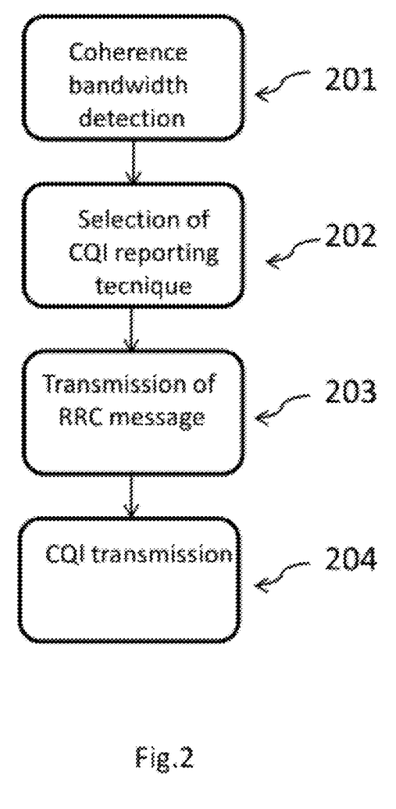
FIG. 2 is a flow diagram illustrating the method according to a first embodiment.

An embodiment of the method implemented by the PLMN network of the invention is disclosed with reference to FIG. 2.

At least one user accesses the network 100 through a user equipment 10; to the purpose of the present invention, a user equipment can be any device suitable to establish a wireless connection with an access equipment of the network. Therefore, within the meaning of the present description a user equipments can be one of a mobile phone, a smart phone, a personal computer, a laptop or a machine provided with a SIM (Subscriber Identification Module) card and relative connection means.

More in particular, the user equipment 10 is connected directly to a radio base station 103 through a wireless transmission channel.

Base station 103 allocates one or more resource blocks to each user equipment based on service requested; it is well known that number of resource blocks is proportional to request and available bit rate of users. The allocation of the resource blocks can be dynamically changed during the connection time. The user equipment transmits and receives data using the allocated resource blocks which therefore represent the transmission channel for the specific user equipment, so it will be simply called user channel. The user channel may have a bandwidth between 1.25 MHz and 20 MHz, or in equivalent way between 7 and 110 resource blocks.

The method starts at step 201, the radio base station 103 detects the coherence bandwidth of a total transmission channel, or at least an estimation of these values. The total transmission channel means the frequency interval that is managed by the mobile station and that is shared by several users, by means of frequency division multiplexing for example.

In order to accomplish this detection, base station 103 receives channel quality indicators (CQIs) from the user equipments 10 connected. CQIs are values that are function of signal to interference plus noise ratio (SINR) of the user channel measured by the user equipments 10. Since there are several CQI typologies, the CQI type sent by each of the user equipments 10 has to be previously determined by the base station 103. For this reason the method provides for a step (antecedent to step 201 and not shown in FIG. 2) wherein the network, and in particular the radio base station serving a user, requests the user equipment to report a first CQI according to a first technique, e.g., a wideband CQI. Preferably, radio base station requests all the users to report the same type of CQI (e.g. a wideband CQI), so as to use it for determining coherence bandwidth.

Figure 3:
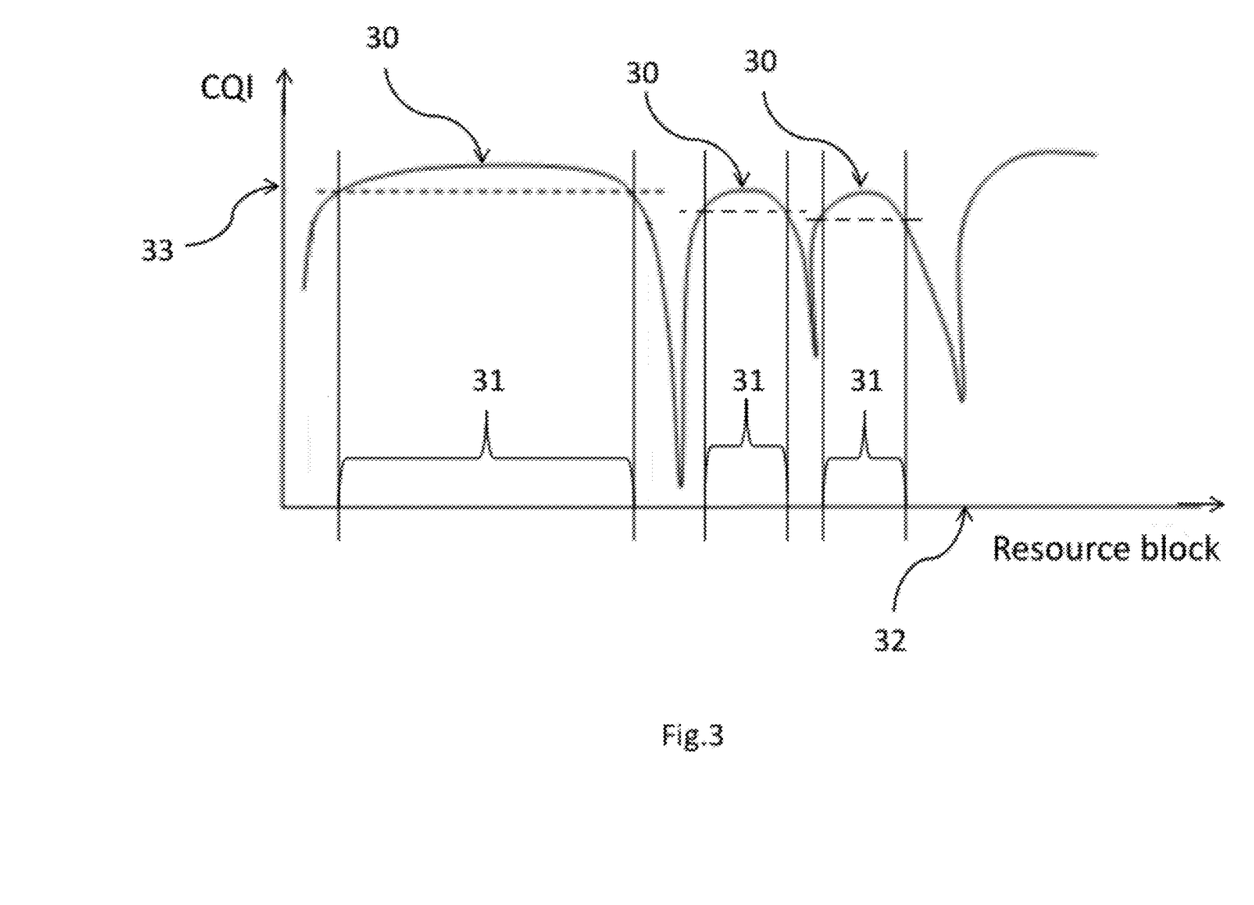
FIG. 3 shows a QCI versus resource block graph for the calculation of the coherence bandwidth.

Each user equipment is associated to particular resource blocks unambiguously in order to the base station 103 may reconstruct a frequency graph of the quality of the total channel, as shown in FIG. 3.

An abscissa axis 32 reports resource blocks allocated, whereas an ordinate axis 33 reports the values of the all CQIs received.

The base station 103 detects the relative maximum points 30 of the CQI versus resource block graph and calculates bandwidths 31 related to each of these points, for example this bandwidth 31 can be defined as the frequency interval in which CQI is comprised between the relative maximum value 30 and 90% of the relative maximum value 30. Finally, base station 103 assumes the smallest bandwidth among the previously calculated ones as an estimation of the total channel coherence bandwidth.

Then, the base station compares the coherence bandwidth to the channel bandwidth of each user equipment in order to select an appropriate CQI reporting technique among the available ones (step 201).

In particular, the channel bandwidth is equal to the number of resource blocks allocated for a user equipment and so it is a value well known to the base station.

Among the available CQI reporting techniques, base station 103 can select one that comprises the transmission of a report that includes a Maximum Allocation Bandwidth parameter, called MAB, and a related CQI, both of them calculated by the user equipment. The CQI is calculated over the bandwidth defined by the MAB. This technique will be called MAB_CQI reporting technique and the report including the MAB and the CQI will be called MAB_CQI report.

The MAB is an estimation of the bandwidth over which adjacent uplink resources can be allocated with a CQI that is better than the wideband CQI, i.e., the CQI which is calculated over the total transmission channel.

CQI value is a scalar number which takes a value between 0 and 15, and is coded with 4 bits.

MAB is defined by a starting resource block and number of adjacent resource block that constitute the MAB. As a consequence, the MAB is comprised between the starting resource block (SRB) and the starting resource block plus the number of resource blocks minus 1 (SRB+MAB−1).

The MAB_CQI reporting is coded by means of only two bytes. The starting resource block and the number of resource block are coded together with a 12 bit identifier, which allows for 4096 possible combinations, clearly in excess of the maximum number of possible combinations of these parameters in LTE systems, i.e., 110 resource block bandwidth. The values for each system bandwidth may be collected in look-up tables or a custom algorithm can be designed to reduce the memory required.

In a preferred embodiment, the MAB_CQI reporting technique is selected if the coherence bandwidth is larger than the user channel bandwidth.

In step 203 the base station 103 transmits to all user equipments 10 connected a message reporting the CQI reporting technique that has been selected in step 202.

In particular, this message is a Radio Resource Control (RRC) message over a Signalling Radio Bearer (SRB), as defined in LTE networks.

The method ends at step 204, wherein all user equipments have received the RRC message indicating the CQI technique to be used (for example this information may be contained in the CQI-ReportConfig field described in the 3GPP specifications) and consequently transmit the CQI according to the technique received. The transmission of the CQI may be accomplished in a periodic way or not.

Figure 5:
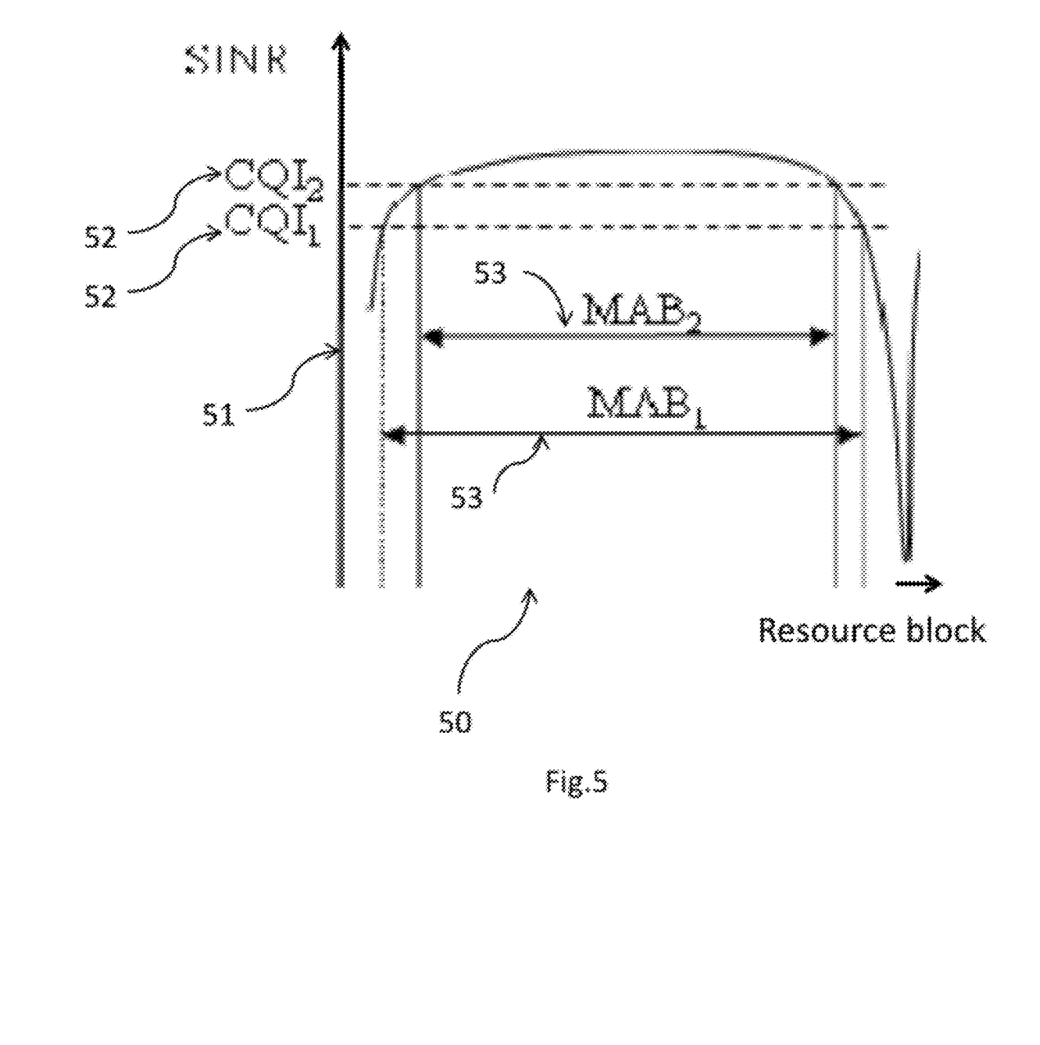
FIG. 5 shows a QCI versus resource block graph for the calculation of the MAB parameter.

In order to calculate the MAB and the CQI values of the MAB_CQI report, the user equipment measures SINR in its own channel and so calculates a SINR versus resource block graph as shown in FIG. 5, wherein the resource blocks are only the resource blocks allocated to the single user equipment. An abscissa axis 50 reports resource blocks of the user equipment, whereas an ordinate axis 51 reports the values of the measured SINR values.

The maximum value of the SINR is detected and then a set of SINR proposed values is selected. In particular the proposed SINR values are comprised between the maximum SINR and a fraction of the maximum SINR, e.g., 80%. After that, the user equipment converts SINR proposed values in proposed CQIs 52.

For every proposed CQI 52 is associated a number of resource blocks corresponding to the CQI comprised between the maximum CQI and the proposed CQI. This number of resource block is a proposed MAB 53. As a consequence, several MAB-CQI pairs can be calculated.

Finally, the user equipment selects the MAB-CQI pair that maximizes the amount of information transmitted.

In fact, due to the variability of the propagation channel, as the proposed MAB increases, the associated proposed CQI tends to decrease, unless the channel frequency response is absolutely flat. If there are several options for MAB-CQI pairs, the chosen one should the one that maximizes the product between the MAB and bit rate per resource block associated to the CQI value.

In alternative, it could be possible also for the user equipment to send several reports with different combinations of MAB-CQI pairs in order to allow the scheduler to have a higher flexibility, at the expense of a higher use of the radio resources, e.g. two bytes for each additional report.

In another alternative embodiment, the user equipment 10 calculates the mean value of SINR its own user channel, after that it selects several SINR proposed values that are greater than the SINR mean value and converts them in proposed CQIs.

The MAB_CQI report may be supported for both periodic and aperiodic CQI reporting.

Notwithstanding the above described method is accomplished by a OFDM based network, the present invention also applies to any mobile network (GSM/GPRS, UMTS, WiMAX, HSPA etc).

It is clear that the man skilled in the art may apply several modification to the method described above.

For example, radio base station may calculate the coherence bandwidth of the channel in a different way.

In one embodiment, the MAB_CQI reporting technique is selected if the coherence bandwidth is greater than a threshold that is a function of the channel bandwidth, as an instance directly proportional to the channel bandwidth, more in particular ten times the channel bandwidth.

In a preferred embodiment, if the coherence bandwidth is lower than the threshold, the base station selects a well known CQI reporting technique, for example the one disclosed in patent application US 2009/0257356.

In another embodiment, the radio base station compares the coherence bandwidth with a predetermined threshold value and selects the type of CQI reporting technique to be used by all user equipments that so receive the same RRC message.

Figure 4:
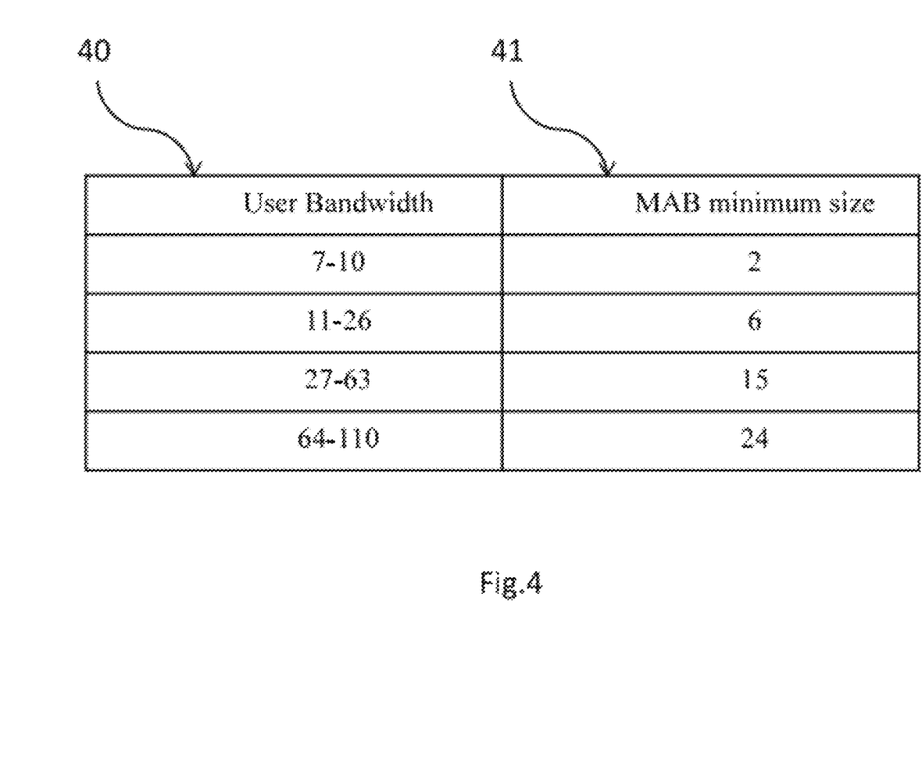
FIG. 4 shows a table containing sizes of a MAB parameter to be reported according to an embodiment of the present invention.

In alternative to the method for calculating MAB described above, in order to reduce the amount of resources needed to code the MAB_CQI report, a minimum size of the MAB is assumed taking into account the user bandwidth employed. For example, table shown in FIG. 4 collects the minimum MAB size values, in column 41, as a function of the user bandwidth, in column 40, both of them are expressed in term of number of resource blocks.

Moreover, CQIs can be function of other measured parameters, like Bit Error Rate, Block Error Rate, Frame Error Rate, Signal to Noise Ratio etc.

Notwithstanding the invention has been described with reference to a method for reporting CQI, the invention is not limited to the method and is also directed to the equipments used to implement the method. In particular, the invention is directed to a radio base station, a public mobile network and a user equipment.

The radio base station comprises means for establishing a wireless connection with a plurality of user equipment and means for receiving channel quality information from the plurality of user equipments. The radio base station further comprises means for detecting a coherence bandwidth associated to a total transmission channel. The total transmission channel includes the user transmission channels of the user equipments connected.

The radio base station comprises means for selecting one reporting technique for reporting channel quality information among a plurality of available reporting techniques, wherein the selection is based on the coherence bandwidth detected.

Finally, the radio base station comprises means for transmitting a message to each of the user equipments, said message reporting an indication of the selected reporting technique.

In a favorite embodiment, the means for detecting are adapted to detect the coherence bandwidth based on channel quality information received by the plurality of user equipments.

The selecting means may be adapted to select the reporting technique on a user equipment per user equipment basis and to select a MAB_CQI reporting technique if the coherence bandwidth is larger than the bandwidth of the user transmission channel assigned to the user equipment. The MAB_CQI reporting technique comprises the following set of values:
a channel quality indicator,
an index representing a starting resource block and
a number of adjacent resource blocks.

The channel quality indicator is calculated over a resource block interval defined by the starting resource block and the number of adjacent resource blocks, i.e., this interval is comprised between the starting resource block and the starting resource block plus the number of adjacent resource blocks.

The radio base station may select the MAB_CQI reporting technique if the coherence bandwidth is larger than a predetermined value.

The invention is also directed to a public mobile network characterized by comprising at least a radio base station as described above.

Finally, it is remarked that the invention is also directed to a user equipment which comprises means for establishing wireless connection to at least a radio base station of a wireless communication network, and means for reporting a channel quality information to the radio base station. The user equipment is adapted to report said channel quality information according to a MAB_CQI reporting technique which comprises the following set of values:
a channel quality indicator,
an index representing a starting resource block and
a number of adjacent resource blocks.

The channel quality indicator is calculated over a resource block interval defined by said starting resource block and said number of adjacent resource blocks, i.e., this interval is comprised between the starting resource block and the starting resource block plus the number of adjacent resource blocks.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. Method for reporting channel quality information in a wireless telecommunication network, wherein said network comprises a radio base station in wireless communication with a plurality of user equipment by means of respective user transmission channels, said method being characterized in that said radio base station
   detects a coherence bandwidth associated to a total transmission channel, said total transmission channel comprising the user transmission channels of said plurality of user equipment;
   selects one reporting technique for reporting channel quality information among a plurality of available reporting techniques, the selection being based on said coherence bandwidth;
   transmits a first message to each of said plurality of user equipment, said message reporting an indication of the selected reporting technique;
   wherein said available reporting techniques comprise a MAB_CQI reporting technique, said MAB_CQI reporting technique comprising the following set of values:
   a channel quality indicator,
   an index representing a starting resource block, and
   a number of adjacent resource blocks,
      wherein said resource blocks are basic scheduling units of said network, wherein said channel quality indicator is calculated over a resource block interval defined by said starting resource block and said number of adjacent resource blocks.

2. Method according to claim 1, wherein said radio base station detects said coherence bandwidth based on channel quality information received by said plurality of user equipment.

3. Method according to claim 1, wherein said channel quality indicator is greater than a channel quality indicator calculated over the total transmission channel.

4. Method according to claim 1, wherein said set of values is chosen in order to maximize the product between said number of adjacent resource blocks and a bit rate per resource block associated to said channel quality indicator.

5. Method according to claim 1, wherein selection of the reporting technique is made on a user equipment per user equipment basis and wherein said radio base station selects said MAB_CQI reporting technique if said coherence bandwidth is larger than the bandwidth of the user transmission channel assigned to said user equipment.

6. Method according to claim 1, wherein said radio base station selects said MAB_CQI reporting technique if said coherence bandwidth is larger than a predetermined value.

7. Method according to claim 1, wherein said channel quality indicator is encoded through 4 bits, said index representing a starting resource block and said number of adjacent resource blocks are encoded through 12 bits.

8. Method according to claim 1, wherein said channel quality indicator is related to minimum signal to interference plus noise ratio in a resource blocks interval defined by said starting resource block and said number of adjacent resource blocks.

9. Method according to claim 8, wherein said minimum signal to interference plus noise ratio is greater than a signal to interference plus noise ratio mean value in said resource blocks interval.

10. Radio base station comprising means for establishing a wireless connection with a plurality of user equipment and means for receiving channel quality information from said plurality of user equipment, said radio base station being characterized by comprising:
   means for detecting a coherence bandwidth associated to a total transmission channel, said total transmission channel comprising the user transmission channels of said plurality of user equipment;
   means for selecting one reporting technique for reporting channel quality information among a plurality of available reporting techniques, the selection being based on said coherence bandwidth;
   means for transmitting a message to each of said plurality of user equipment, said message reporting an indication of the selected reporting technique;
   wherein said selecting means are adapted to select the reporting technique on a user equipment per user equipment basis and to select a MAB_CQI reporting technique if said coherence bandwidth is larger than the bandwidth of the user transmission channel assigned to said user equipment, said MAB_CQI reporting technique comprising the following set of values:
   a channel quality indicator,
   an index representing a starting resource block, and
   a number of adjacent resource blocks,
      wherein said resource blocks are basic scheduling units of said network, wherein said channel quality indicator is calculated over a resource block interval defined by said starting resource block and said number of adjacent resource blocks.

11. Radio base station according to claim 10, wherein said means for detecting are adapted to detect said coherence bandwidth based on channel quality information received by said plurality of user equipment.

12. Radio base station according to claim 10, wherein said radio base station selects said MAB_CQI reporting technique if said coherence bandwidth is larger than a predetermined value.

13. Public mobile network characterized by comprising at least a radio base station according to claim 10.

14. User equipment comprising means for establishing wireless connection to at least a radio base station of a wireless communication network, and means for reporting a channel quality information to said radio base station, characterized in that said user equipment is adapted to report said channel quality information according to a MAB_CQI reporting technique, said MAB_CQI reporting technique comprising the following set of values:
   a channel quality indicator,
   an index representing a starting resource block and
   a number of adjacent resource blocks,
      wherein said resource blocks are basic scheduling units of said network, wherein said channel quality indicator is calculated over a resource block interval defined by said starting resource block and said number of adjacent resource blocks.

* * * * *